(12) United States Patent
Ebato et al.

(10) Patent No.: US 11,799,096 B2
(45) Date of Patent: Oct. 24, 2023

(54) POWER GENERATION CELL AND FUEL CELL STACK

(71) Applicant: HONDA MOTOR CO., LTD., Tokyo (JP)

(72) Inventors: Yutaka Ebato, Wako (JP); Satoru Terada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 502 days.

(21) Appl. No.: 17/074,908

(22) Filed: Oct. 20, 2020

(65) Prior Publication Data

US 2022/0123328 A1    Apr. 21, 2022

(51) Int. Cl.
| | |
|---|---|
| H01M 8/00 | (2016.01) |
| H01M 8/0258 | (2016.01) |
| H01M 8/0232 | (2016.01) |
| H01M 8/04089 | (2016.01) |
| H01M 8/1004 | (2016.01) |
| H01M 8/04858 | (2016.01) |
| H01M 8/0273 | (2016.01) |
| H01M 8/0254 | (2016.01) |
| H01M 8/026 | (2016.01) |

(52) U.S. Cl.
CPC ....... *H01M 8/0258* (2013.01); *H01M 8/0232* (2013.01); *H01M 8/0254* (2013.01); *H01M 8/0273* (2013.01); *H01M 8/04089* (2013.01); *H01M 8/0494* (2013.01); *H01M 8/1004* (2013.01); *H01M 8/026* (2013.01)

(58) Field of Classification Search
CPC ............ H01M 8/0258; H01M 8/0232; H01M 8/0273; H01M 8/04089; H01M 8/1004; H01M 8/0254; H01M 8/026
See application file for complete search history.

(56) References Cited

U.S. PATENT DOCUMENTS

| | | |
|---|---|---|
| 9,017,895 B2 | 4/2015 | Rock et al. |
| 9,490,497 B2 | 11/2016 | Yamamoto et al. |
| 10,573,905 B2 | 2/2020 | Ishida et al. |
| (Continued) | | |

FOREIGN PATENT DOCUMENTS

| | | |
|---|---|---|
| JP | 2010-540776 A | 12/2010 |
| JP | 2014-518584 A | 7/2014 |
| (Continued) | | |

OTHER PUBLICATIONS

Office Action dated Jan. 10, 2023 issued over the corresponding Japanese Patent Application No. 2021-113251 with the English translation thereof.

*Primary Examiner* — Cynthia H Kelly
*Assistant Examiner* — Monique M Wills
(74) *Attorney, Agent, or Firm* — Carrier, Shende & Associates P.C.; Fulchand P. Shende; Joseph P. Carrier (57) ABSTRACT

A power generation cell of a fuel cell stack includes a resin frame equipped MEA and a first metal separator and a second metal separator. In the power generation cell, the relationship of P1>P2>P3 is satisfied, where P1 indicates a first surface pressure applied from a first seal part and a second seal part to a resin frame member, P2 indicates a second surface pressure applied from a first support part and a second support part to the overlap part, and P3 indicates a third surface pressure applied from first flow field forming protrusions and second flow field forming protrusions to the power generation area.

14 Claims, 6 Drawing Sheets

(56) References Cited

U.S. PATENT DOCUMENTS

| | | | | |
|---|---|---|---|---|
| 2019/0131633 A1* | 5/2019 | Ishida | .................... | H01M 8/026 |
| 2019/0173104 A1* | 6/2019 | Ishida | ................. | H01M 8/0273 |
| 2019/0190038 A1* | 6/2019 | Ishida | ................. | H01M 8/0273 |
| 2019/0214655 A1* | 7/2019 | Nishida | ............. | H01M 8/04089 |
| 2019/0273268 A1* | 9/2019 | Ebato | .................... | H01M 8/242 |

FOREIGN PATENT DOCUMENTS

| | | |
|---|---|---|
| JP | 2019-079736 A | 5/2019 |
| WO | 2009/043600 A1 | 4/2009 |

\* cited by examiner

POWER GENERATION CELL AND FUEL CELL STACK

BACKGROUND OF THE INVENTION

Field of the Invention

The present invention relates to a power generation cell and a fuel cell stack.

Description of the Related Art

The fuel cell stack is formed by stacking a plurality of power generation cells together. Each of the power generation cells includes a resin frame equipped membrane electrode assembly (resin frame equipped MEA) and a pair of metal separators provided on both sides of the resin frame equipped MEA. A compression load is applied to each of the power generation cells in a separator thickness direction (stacking direction of the plurality of power generation cells).

A resin frame equipped MEA includes a membrane electrode assembly (MEA) formed by holding an electrolyte membrane between a first electrode and a second electrode, and a resin frame member provided on the outer peripheral side of an power generation area of the MEA. The resin frame equipped MEA includes an overlap part where an inner peripheral portion of a resin frame member is sandwiched or overlapped with an outer peripheral portion of the first electrode and an outer peripheral portion of the second electrode. Each of the metal separators has a separator body in the form of a metal plate. The separator body includes flow field forming protrusions which contact a power generation area to form a reactant gas flow field as a passage of a reactant gas, and a support part which contacts the overlap part to support the overlap part (specification of U.S. Pat. No. 9,017,895).

SUMMARY OF THE INVENTION

In this regard, in the power generation cell as described above, the separator body may be provided with a seal part which contacts a resin frame member to prevent leakage of reactant gases or a coolant as fluid. The seal part includes a metal bead which is formed integrally with, and protrudes from the separator body. In the state where the compression state is applied to the power generation cell, the first surface pressure is applied from the seal part to the resin frame member, and the second surface pressure is applied from the support part to the overlap part, and the third surface pressure is applied from the flow field forming protrusions to the power generation area.

In the power generation cell, it is required to fix the resin frame member to the MEA, and suppress leakage of the fluid from the seal part, by adjusting the balance among the first surface pressure, the second surface pressure, and the third surface pressure.

The present invention has been made taking such problems into consideration, and an object of the present invention is to provide a power generation cell and a fuel cell stack which make it possible to fix a resin frame member to a membrane electrode assembly by a support part, and effectively suppress leakage of fluid from a seal part.

According to a first aspect of the present invention, a power generation cell is provided. The power generation cell includes a frame equipped membrane electrode assembly, and a pair of metal separators provided on both sides of the resin frame equipped membrane electrode assembly, a compression load being applied to the power generation cell in a separator thickness direction, the frame equipped membrane electrode assembly including a membrane electrode assembly formed by holding an electrolyte membrane between a first electrode and a second electrode, and a resin frame member fixed to the membrane electrode assembly on an outer peripheral side of a power generation area of the membrane electrode assembly, wherein the resin frame equipped membrane electrode assembly includes an overlap part where an internal peripheral portion of the resin frame member is held between an outer peripheral portion of the first electrode and an outer peripheral portion of the second electrode, each of the pair of metal separators includes a separator body in a form of a plate, the separator body is provided with a flow field forming protrusion configured to contact the power generation area and form a reactant gas flow field as a passage of a reactant gas, a support part configured to contact the overlap part to support the overlap part, and a seal part configured to contact the resin frame member and prevent leakage of the reactant gas or a coolant as fluid, the seal part includes a metal bead, each of the flow field forming protrusion, the support part, and the metal bead is formed integrally with, and protrudes from the separator body in a manner that the flow field forming protrusion, the support part, and the metal bead are configured to be deformed elastically by application of the compression load, and a relationship of $P1>P2>P3$ is satisfied, where $P1$ indicates a first surface pressure applied from the seal part to the resin frame member, $P2$ indicates a second surface pressure applied from the support part to the overlap part, and $P3$ indicates a third surface pressure applied from the flow field forming protrusion to the power generation area.

According to a second aspect of the present invention, a fuel cell stack is provided. The fuel cell stack includes a plurality of power generation cells, a compression load being applied to the fuel cell stack in a separator thickness direction, the power generation cells each including a frame equipped membrane electrode assembly, and a pair of metal separators provided on both sides of the resin frame equipped membrane electrode assembly, the frame equipped membrane electrode assembly including a membrane electrode assembly formed by holding an electrolyte membrane between a first electrode and a second electrode, and a resin frame member fixed to the membrane electrode assembly on an outer peripheral side of a power generation area of the membrane electrode assembly, wherein the frame equipped membrane electrode assembly includes an overlap part where an internal peripheral portion of the resin frame member is held between an outer peripheral portion of the first electrode and an outer peripheral portion of the second electrode, each of the pair of metal separators includes a separator body in a form of a plate, the separator body is provided with a flow field forming protrusion configured to contact the power generation area and form a reactant gas flow field as a passage of a reactant gas, a support part configured to contact the overlap part to support the overlap part, and a seal part configured to contact the resin frame member and prevent leakage of the reactant gas or a coolant as fluid, the seal part comprises a metal bead, each of the flow field forming protrusion, the support part, and the metal bead is formed integrally with, and protrudes from the separator body in a manner that the flow field forming protrusion, the support part, and the metal bead are configured to be deformed elastically by application of the compression load, a relationship of $P1>P2>P3$ is satisfied, where $P1$ indicates a first surface pressure applied from the seal part to the resin frame member, P2 indicates a second surface pressure applied from the support part to the overlap part, and P3 indicates a third surface pressure applied from the flow field forming protrusion to the power generation area.

In the present invention, since the second surface pressure P2 is larger than the third surface pressure P3, it is possible to reliably fix the resin frame member to the membrane electrode assembly by the support part. Further, since the first surface pressure P1 is larger than the second surface pressure P2, it is possible to effectively suppress leakage of the fluid from the seal part.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a power generation cell and a fuel cell stack according to the present invention will be described with reference to the accompanying drawings.

Figure 1:
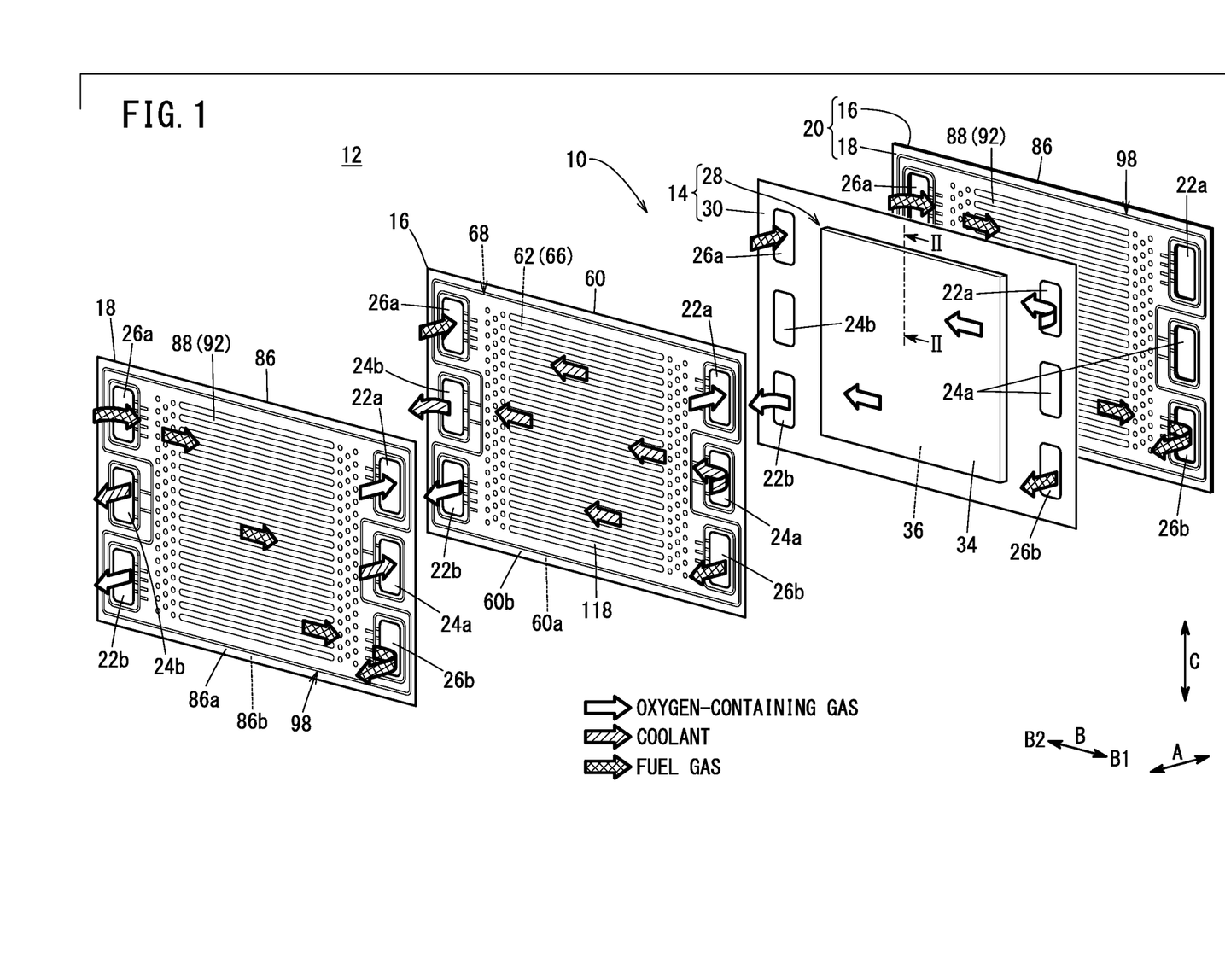
FIG. 1 is an exploded perspective view of a power generation cell forming a fuel cell stack according to an embodiment of the present invention.

As shown in FIG. 1, a fuel cell stack 12 according to the embodiment of the present invention is formed by stacking a plurality of power generation cells 10 together in a direction indicated by an arrow A. For example, the fuel cell stack 12 is mounted on a fuel cell automobile (not shown). In this case, the fuel cell stack 12 is mounted in a fuel cell automobile in a manner that the stacking direction of the power generation cells 10 is oriented in a horizontal direction (the vehicle width direction or the vehicle length direction). However, it should be noted that the fuel cell stack 12 may be mounted in a fuel cell automobile in a manner that the stacking direction of the plurality of power generation cells 10 is oriented in a vertical direction (vehicle height direction) of the fuel cell automobile. Further, the fuel cell stack 12 may be used in a stationary application.

Figure 2:
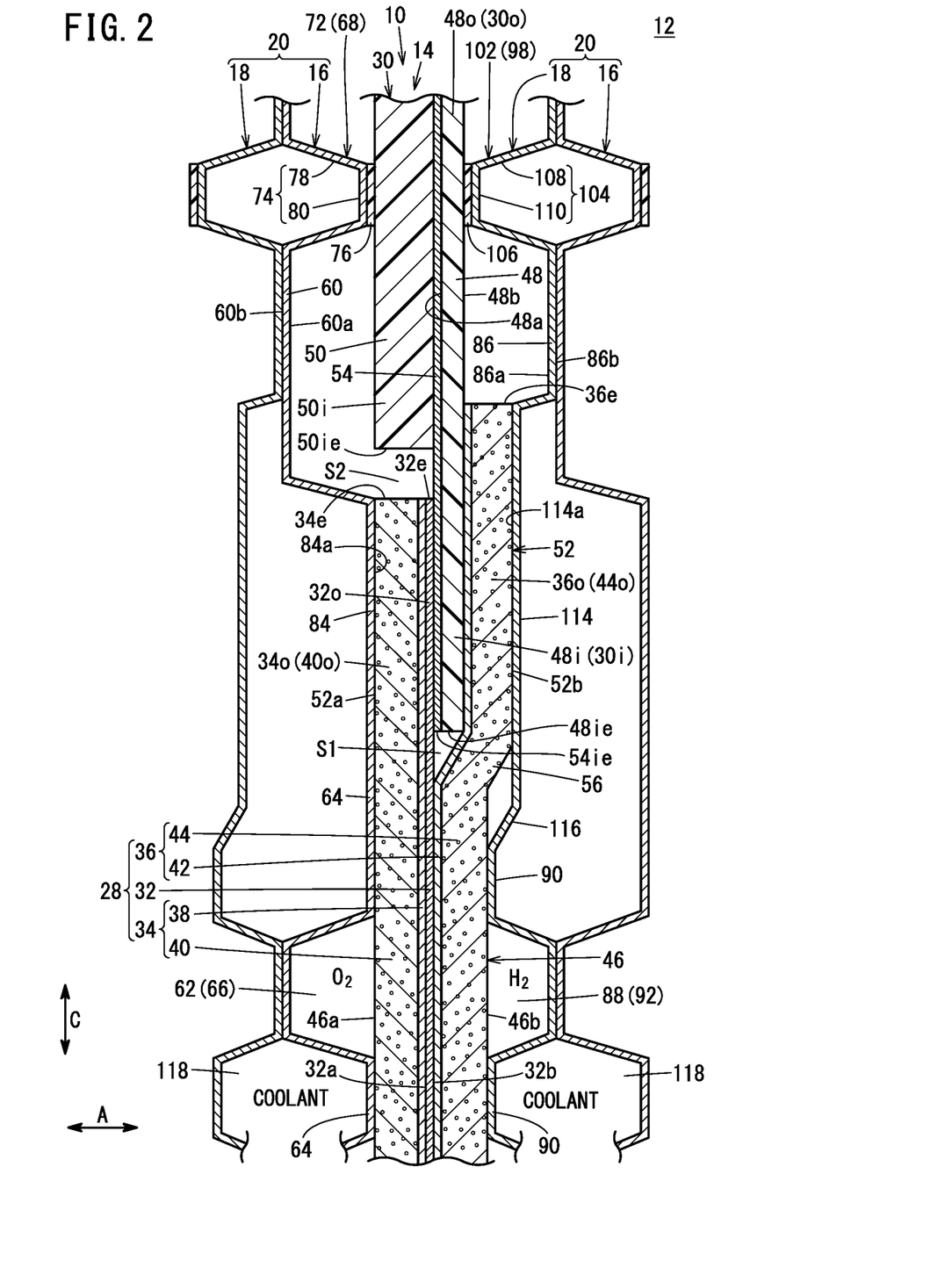
FIG. 2 is a partial vertical cross sectional view taken along a line II-II in FIG. 1.

In FIG. 1, the power generation cell 10 has a laterally elongated rectangular shape. However, the power generation cell 10 may have a vertically elongated shape. As shown in FIGS. 1 and 2, the power generation cell 10 includes a resin frame equipped membrane electrode assembly (hereinafter referred to as a "resin frame equipped MEA 14"), and a pair of metal separators (a first metal separator 16 and a second metal separator 18) provided on both sides of the resin frame equipped MEA 14.

Each of the first metal separator 16 and the second metal separator 18 is formed by press forming of a metal thin plate to have a corrugated shape in cross section. For example, the metal plate is a steel plate, a stainless steel plate, an aluminum plate, a plated steel plate, or a metal plate having an anti-corrosive surface by surface treatment. An outer peripheral portion of a first metal separator 16 of one of the power generation cells 10 that are adjacent to each other and an outer peripheral portion of a second metal separator 18 of the other of the power generation cells 10 are joined together integrally by welding, brazing, crimping, etc. to form a joint separator 20. That is, the fuel cell stack 12 is formed by stacking the resin frame equipped MEAs 14 and the joint separators 20 together, alternately.

In FIG. 1, at one end of each of the power generation cells 10 in a long side direction (end in the direction indicated by an arrow B1), an oxygen-containing gas supply passage 22a, a coolant supply passage 24a, and a fuel gas discharge passage 26b are arranged in a direction indicated by an arrow C (vertical direction). The oxygen-containing gas supply passage 22a extends through each of the power generation cells 10 in the direction indicated by the arrow A, for supplying the oxygen-containing gas ($O_2$ gas). The coolant supply passage 24a extends through each of the power generation cells 10 in the direction indicated by the arrow A for supplying the coolant such as water. The fuel gas discharge passage 26b extends through each of the power generation cells 10 in the direction indicated by the arrow A for discharging the hydrogen-containing gas ($H_2$ gas).

At the other end of the power generation cell 10 (end in the direction indicated by an arrow B2), a fuel gas supply passage 26a, a coolant discharge passage 24b, and an oxygen-containing gas discharge passage 22b are arranged in a direction indicated by an arrow C. The fuel gas supply passage 26a extends through each of the power generation cells 10 in the direction indicated by the arrow A for supplying a fuel gas. The coolant discharge passage 24b extends through each of the power generation cells 10 in the direction indicated by the arrow A for discharging the coolant. The oxygen-containing gas discharge passage 22b extends through each of the power generation cells 10 in the direction indicated by the arrow A, for discharging the oxygen-containing gas. The numbers, the positions, the shapes, and the sizes of the oxygen-containing gas supply passage 22a, the oxygen-containing gas discharge passage 22b, the coolant supply passage 24a, the coolant discharge passage 24b, the fuel gas supply passage 26a, and the fuel gas discharge passage 26b are not limited to those in the present embodiment, and may be determined as necessary depending on the required specification.

As shown in FIGS. 1 and 2, the resin frame equipped MEA 14 includes a membrane electrode assembly (hereinafter referred to as a "MEA 28"), and a resin frame member 30 provided on an outer peripheral portion of the MEA 28.

In FIG. 2, the MEA 28 includes an electrolyte membrane 32, and a first electrode 34 and a second electrode 36 sandwiching the electrolyte membrane 32. For example, the electrolyte membrane 32 is a solid polymer electrolyte membrane (cation ion exchange membrane). For example, the sold polymer electrolyte membrane is a thin membrane of perfluorosulfonic acid containing water. A fluorine based electrolyte may be used as the electrolyte membrane 32. Alternatively, an HC (hydrocarbon) based electrolyte may be used as the electrolyte membrane 32.

The first electrode 34 is a cathode. The first electrode 34 includes a first electrode catalyst layer 38 joined to one surface 32a of the electrolyte membrane 32, and a first gas diffusion layer 40 stacked on the first electrode catalyst layer 38. The second electrode 36 is an anode. The second electrode 36 includes a second electrode catalyst layer 42 joined to another surface 32b of the electrolyte membrane 32, and a second gas diffusion layer 44 stacked on the second electrode catalyst layer 42.

For example, the first electrode catalyst layer 38 is formed by porous carbon particles deposited uniformly on the surface of the first gas diffusion layer 40 together with an ion conductive polymer binder and platinum alloy supported on the surfaces of the porous carbon particles. For example, the second electrode catalyst layer 42 is formed by porous carbon particles deposited uniformly on the surface of the second gas diffusion layer 44 together with an ion conductive polymer binder and platinum alloy supported on the surfaces of the porous carbon particles. Each of the first gas diffusion layer 40 and the second gas diffusion layer 44 comprises a carbon paper, a carbon cloth, etc.

The surface size (outer size) of the second electrode 36 is larger than the surface size of the first electrode 34. Stated otherwise, the surface size of the second gas diffusion layer 44 is larger than the surface size of the first gas diffusion layer 40. An outer peripheral end 36e of the second electrode 36 is positioned outside an outer peripheral end 34e of the first electrode 34. The surface size of the electrolyte membrane 32 is the same as the surface size of the first electrode 34. In the surface direction (indicated by an arrow C in FIG. 2) of the electrolyte membrane 32, an outer peripheral end 32e of the electrolyte membrane 32 is present at the same position as the outer peripheral end 34e of the first electrode 34.

As shown in FIG. 1, the resin frame member 30 is formed in a quadrangular annular shape around the outer peripheral portion of the MEA 28. At one end of the resin frame member 30 in the long side direction (end in the direction indicated by the arrow B1), the oxygen-containing gas supply passage 22a, the coolant supply passage 24a and the fuel gas discharge passage 26b are provided. At the other end of the resin frame member 30 in the longitudinal direction (end in the direction indicated by the arrow B2), the fuel gas supply passage 26a, the coolant discharge passage 24b and the oxygen-containing gas discharge passage 22b are provided.

As shown in FIG. 2, the resin frame member 30 is provided in the outer peripheral side of a power generation area 46 of the MEA 28. In this regard, the power generation area 46 herein means a portion of the MEA 28 where the first electrode catalyst layer 38 contacts one surface 32a of the electrolyte membrane 32, and the second electrode catalyst layer 42 contacts the other surface 32b of the electrolyte membrane 32.

The resin frame member 30 has a first frame shaped sheet 48 and a second frame shaped sheet 50. An inner peripheral portion 48i of the first frame shaped sheet 48 is joined to an outer peripheral portion of the MEA 28. The inner peripheral portion 48i of the first frame shaped sheet 48 is sandwiched between an outer peripheral portion 32o of the electrolyte membrane 32 and an outer peripheral portion 36o of the second electrode 36. Specifically, the inner peripheral portion 48i of the first frame shaped sheet 48 is positioned between the electrolyte membrane 32 and the second electrode catalyst layer 42. Stated otherwise, the resin frame equipped MEA 14 includes an overlap part 52 where the inner peripheral portion 48i of the first frame shaped sheet 48 (inner peripheral portion 30i of the resin frame member 30) is held between an outer peripheral portion 34o of the first electrode 34 and the outer peripheral portion 36o of the second electrode 36. That is, the overlap part 52 herein means a portion where the inner peripheral portion 48i of the first frame shaped sheet 48, the outer peripheral portion 34o of the first electrode 34, the outer peripheral portion 36o of the second electrode 36, and the outer peripheral portion 32o of the electrolyte membrane 32 are overlapped together in the direction indicated by the arrow A.

An adhesive layer 54 made of an adhesive is provided on one surface 48a of the first frame shaped sheet 48 (surface where the first electrode 34 is positioned). The outer peripheral portion 32o of the electrolyte membrane 32 is joined to the inner peripheral portion 48i of the first frame shaped sheet 48 through the adhesive layer 54. The second frame shaped sheet 50 is joined to an outer peripheral portion 48o of the first frame shaped sheet 48 through the adhesive sheet 54.

The adhesive layer 54 is provided over one surface 48a of the first frame shaped sheet 48. It should be noted that the adhesive layer 54 may be provided partially on one surface 48a of the first frame shaped sheet 48. It should be noted that the adhesive forming the adhesive layer 54 is only coated on one surface 48a of the first frame shaped sheet 48, and no adhesive is coated on another surface 48b of the first frame shaped sheet 48 (surface where the second electrode 36 is positioned). The adhesive forming the adhesive layer 54 may be coated on the outer peripheral portion 32o of the electrolyte membrane 32, and the second frame shaped sheet 50. The adhesive comprises material which is not permeable to reactant gases (a fuel gas and an oxygen-containing gas). The adhesive need not necessarily be limited to be in the liquid or solid state, or thermoplastic material, thermosetting material, etc.

The second electrode 36 includes an inclined portion 56 inclined from the power generation area 46 toward the overlap part 52 (outer peripheral portion of the second electrode 36), opposite to the first electrode 34. It should be noted that each of the first electrode 34 and the electrolyte membrane 32 extends from the power generation area 46 to the overlap part 52 without any step. An outer surface 52a of the overlap part 52 adjacent to the first electrode 34 and an outer surface 46a of the power generation area 46 adjacent to the first electrode 34 are positioned on the same plane surface. An outer surface 46b of the power generation area 46 adjacent to the second electrode 36 is positioned closer to the electrolyte membrane 32 in comparison with an outer surface 52b of the overlap part 52 adjacent to the second electrode 36.

An inner peripheral end 48ie of the first frame shaped sheet 48 has a flat shape in the direction indicated by the arrow A. Internal space S1 is formed between the power generation area 46 and the overlap part 52. In FIG. 2, the internal space S1 has a triangular shape. The internal space S1 is a space surrounded by the inner peripheral end 48ie of the first frame shaped sheet 48, an inner peripheral end 54ie of the adhesive layer 54, the other surface 32b of the electrolyte membrane 32, and the inclined portion 56 of the second electrode 36.

An inner peripheral end 50ie of the second frame shaped sheet 50 faces the outer peripheral end 34e of the first electrode 34 with a gap S2 (space) along the entire periphery. That is, the second frame shaped sheet 50 is not held between the outer peripheral portion 34o of the first electrode 34 and the outer peripheral portion 36o of the second electrode 36. The inner peripheral end 50ie of the second frame shaped sheet 50 is positioned inside the outer peripheral end 36e of the second electrode 36. That is, the outer peripheral portion 36o of the second electrode 36 (an outer peripheral portion 44*o* of the second gas diffusion layer 44) is formed in a manner that the outer peripheral portion 36*o* of the second electrode 36 is overlapped with an inner peripheral portion 50*i* of the second frame shaped sheet 50 in the separator thickness direction (indicated by the arrow A).

The thickness of the first frame shaped sheet 48 and the thickness of the second frame shaped sheet 50 are different from each other. The thickness of the second frame shaped sheet 50 is larger than the thickness of the first frame shaped sheet 48. However, the thickness of the second frame shaped sheet 50 may be the same as the first frame shaped sheet 48, or smaller than the first frame shaped sheet 48.

Each of the first frame shaped sheet 48 and the second frame shaped sheet 50 is made of resin material which is not permeable to the reactant gases. Examples of materials of the first frame shaped sheet 48 and the second frame shaped sheet 50 include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

The resin frame member 30 is not limited to structure where the first frame shaped sheet 48 and the second frame shaped sheet 50 are joined together by the adhesive layer 54. The resin frame member 30 may be in the form of a one-piece member which is formed integrally. Further, the resin frame member 30 is not limited to the stepped shape having the thin inner peripheral portion 30*i* and a thick outer peripheral portion 30*o*. The resin frame member 30 may have a shape without any step from the inner peripheral portion 30*i* to the outer peripheral portion 30*o* (substantially flat shape). The inner peripheral portion 30*i* of the resin frame member 30 (inner peripheral portion 48*i* of the first frame shaped sheet 48) may be held between the outer peripheral portion 32*o* of the electrolyte membrane 32 and the outer peripheral portion 34*o* of the first electrode 34. The outer peripheral end 36*e* of the second electrode 36 may be positioned inside the inner peripheral end 50*ie* of the second frame shaped sheet 50. Stated otherwise, the outer peripheral portion 36*o* of the second electrode 36 (the outer peripheral portion 44*o* of the second gas diffusion layer 44) may be formed in a manner that the outer peripheral portion 36*o* of the second electrode 36 is not overlapped with the second frame shaped sheet 50 in the separator thickness direction.

Figure 3:
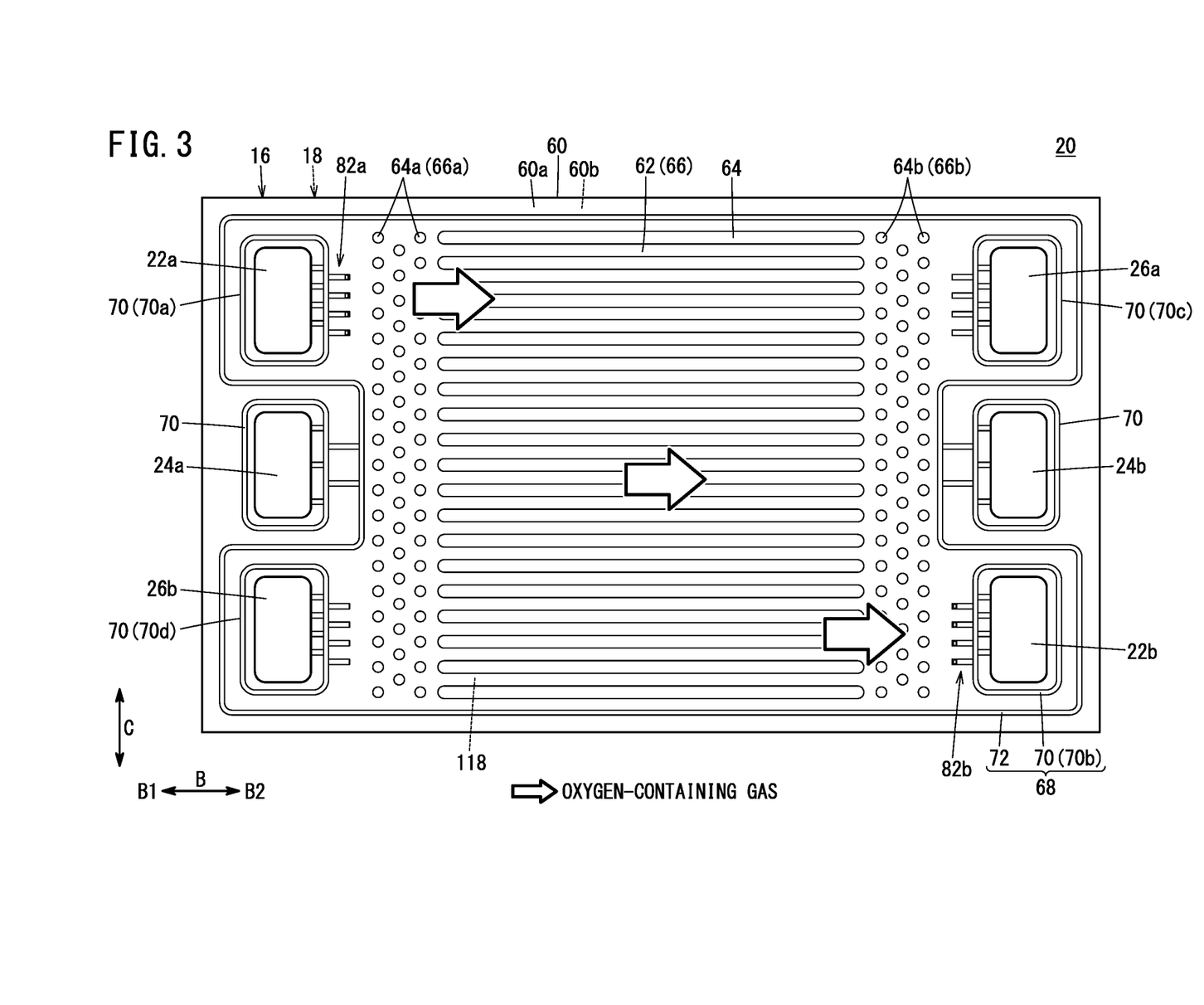
FIG. 3 is a plan view showing a first metal separator in FIG. 1, as viewed from an MEA side.

As shown in FIG. 3, the first metal separator 16 includes a first separator body 60 in the form of a metal plate. The first separator body 60 has a straight oxygen-containing gas flow field 62 on its surface (hereinafter referred to as a "surface 60*a*") facing the resin frame equipped MEA 14. For example, the oxygen-containing gas flow field 62 extends in a longitudinal direction (indicated by the arrow B) of the first separator body 60.

The oxygen-containing gas flow field 62 is connected to (in fluid communication with) the oxygen-containing gas supply passage 22*a* and the oxygen-containing gas discharge passage 22*b*. The oxygen-containing gas flow field 62 includes a plurality of straight first flow grooves 66 formed between a plurality of straight first flow field forming protrusions 64 extending in the direction indicated by the arrow B. Therefore, in the oxygen-containing gas flow field 62, the plurality of first flow field forming protrusions 64 and a plurality of first flow grooves 66 are arranged alternately in the flow field width direction (indicated by an arrow C).

In FIG. 2, each of the first flow field forming protrusions 64 is formed integrally with the first separator body 60 in a manner that the first flow field forming protrusions 64 protrudes from the first separator body 60 toward the resin frame equipped MEA 14. Each of the first flow field forming protrusions 64 has a trapezoidal shape which is tapered toward the protruding direction of the first flow field forming protrusions 64. It should be noted that each of the first flow field forming protrusions 64 may have a rectangular shape in lateral cross section. A protruding end surface of each of the first flow field forming protrusions 64 contacts the outer surface of the first gas diffusion layer 40. It should be noted that the oxygen-containing gas flow field 62 (the first flow field forming protrusions 64 and the first flow grooves 66) may extend in a wavy pattern in the direction indicated by the arrow B.

As shown in FIG. 3, a first inlet buffer 66*a* is provided on the surface 60*a* of the first separator body 60, between the oxygen-containing gas supply passage 22*a* and the oxygen-containing gas flow field 62. The first inlet buffer 66*a* includes a plurality of boss arrays each comprising a plurality of bosses 64*a* arranged in the direction indicated by the arrow C. Further, a first outlet buffer 66*b* is provided in the surface 60*a* of the first separator body 60, between the oxygen-containing gas discharge passage 22*b* and the oxygen-containing gas flow field 62. The first outlet buffer 66*b* includes a plurality of boss arrays each comprising a plurality of bosses 64*b*.

A first seal part 68 is formed on the surface 60*a* of the first separator body 60, for preventing leakage of fluid (the reactant gases and the coolant). As viewed in the separator thickness direction (indicated by an arrow A), the first seal part 68 extends straight. Alternatively, as viewed in the separator thickness direction, the first seal part 68 may extend in a wavy pattern.

The first seal part 68 includes a plurality of first passage seals 70 and a first outer peripheral seal part 72. The plurality of first passage seals 70 surround the oxygen-containing gas supply passage 22*a*, the oxygen-containing gas discharge passage 22*b*, the coolant supply passage 24*a*, the coolant discharge passage 24*b*, the fuel gas supply passage 26*a*, the fuel gas discharge passage 26*b*, respectively.

Hereinafter, among the plurality of first passage seals 70, the first passage seal 70 which surrounds the oxygen-containing gas supply passage 22*a* will be referred to as a "first passage seal 70*a*", the first passage seal 70 which surrounds the oxygen-containing gas discharge passage 22*b* will be referred to as a "first passage seal 70*b*", the first passage seal 70 which surrounds the fuel gas supply passage 26*a* will be referred to as a "first passage seal 70*c*", and the first passage seal 70 which surrounds the fuel gas discharge passage 26*b* will be referred to as a "first passage seal 70*d*".

The first outer peripheral seal part 72 is provided in an annular shape in the outer peripheral portion of the first separator body 60. The first outer peripheral seal part 72 prevents leakage of the oxygen-containing gas. The first outer peripheral seal part 72 surrounds the oxygen-containing gas flow field 62, the first inlet buffer 66*a*, the first outlet buffer 66*b*, and the plurality of first passage seals 70*a* to 70*d*.

As shown in FIG. 2, the first seal part 68 includes a first metal bead 74 formed integrally with the first separator body 60 in a manner that the first seal part 68 protrudes toward the resin frame equipped MEA 14, and a first resin member 76 provided on the first metal bead 74. The lateral cross sectional shape of the first metal bead 74 is a trapezoidal shape tapered toward the protruding direction of the first metal bead 74.

The first metal bead 74 includes a pair of first bead side portions 78 disposed in a manner to face each other, and a first bead top portion 80 coupling protruding ends of the pair of first bead side portions 78. The space between the pair of first bead side portions 78 is narrowed gradually toward the first bead top portion 80. It should be noted that the first bead side portion 78 may be in parallel to the separator thickness direction (indicated by the arrow A). That is, the first metal bead 74 may have a rectangular shape in lateral cross section.

The first resin member 76 is an elastic member fixed to the protruding end surface of the first metal bead 74 (outer surface of the first bead top portion 80) by printing or coating. For example, the first resin member 76 is made of polyester fiber, EPDM (ethylene propylene diene monomer) rubber, fluorine or silicone. The first resin member 76 is not porous member. Further, in the case where the first resin member 76 comprises closed foams, the first resin member 76 may be porous. Further, the first resin member 76 may be dispensed with.

In FIG. 3, the first separator body 60 is provided with a first inlet bridge 82a connecting the inside (closer to the oxygen-containing gas supply passage 22a) and the outside (closer to the oxygen-containing gas flow field 62) of the first passage seal 70a. The first separator body 60 is provided with a first outlet bridge 82b connecting the inside (closer to the oxygen-containing gas discharge passage 22b) and the outside (closer to the oxygen-containing gas flow field 62) of the first passage seal 70b.

As shown in FIG. 2, the first separator body 60 is provided with a first support part 84 for supporting the overlap part 52. The first support part 84 is formed integrally with the first separator body 60 in a manner that the first support part 84 protrudes toward the rein frame equipped MEA 14. A protruding end surface 84a of the first support part 84 contacts an outer peripheral part 40o of the first gas diffusion layer 40. The first support part 84 is positioned between the first outer peripheral seal part 72 and the oxygen-containing gas flow field 62.

Figure 4:
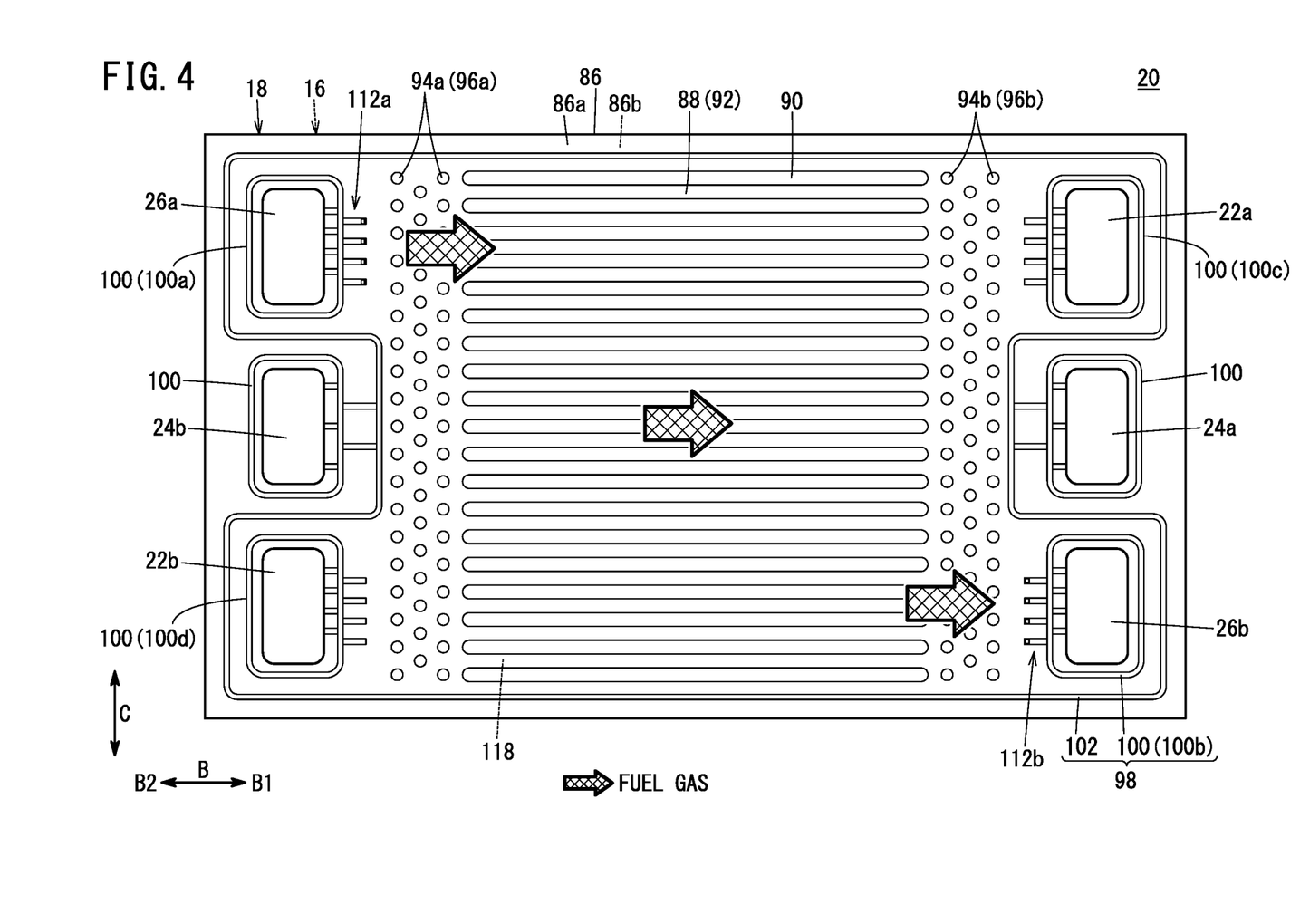
FIG. 4 is a plan view showing a second metal separator in FIG. 1, as viewed from the MEA side.

As shown in FIG. 4, the second metal separator 18 includes a second separator body 86 in the form of a metal plate. The second separator body 86 has a straight fuel gas flow field 88 on its surface (hereinafter referred to as a "surface 86a") facing the resin frame equipped MEA 14. For example, the fuel gas flow field 88 extends straight in a longitudinal direction (indicated by the arrow B) of the second separator body 86.

The fuel gas flow field 88 is connected to (in fluid communication with) the fuel gas supply passage 26a and the fuel gas discharge passage 26b. The fuel gas flow field 88 includes a plurality of straight second flow grooves 92 formed between a plurality of straight second flow field forming protrusions 90 extending in the direction indicated by the arrow B. Therefore, in the fuel gas flow field 88, the plurality of second flow field forming protrusions 90 and the plurality of second flow grooves 92 are arranged alternately in the flow field width direction (indicated by the arrow C).

In FIG. 2, each of the second flow field forming protrusions 90 is formed integrally with the second separator body 86 in a manner that the second flow field forming protrusions 90 protrude from the second separator body 86 toward the resin frame equipped MEA 14. Each of the second flow field forming protrusions 90 has a trapezoidal shape which is tapered toward the protruding direction of the second flow field forming protrusions 90. It should be noted that each of the second flow field forming protrusions 90 may have a rectangular shape in lateral cross section. Each of the protruding end surfaces of the second flow field forming protrusions 90 contacts the outer surface of the second gas diffusion layer 44. It should be noted that the fuel gas flow field 88 (the second flow field forming protrusions 90 and the second flow grooves 92) may extend in a wavy pattern in the direction indicated by the arrow B.

As shown in FIG. 4, a second inlet buffer 96a is provided on a surface 86a of the second separator body 86, between the fuel gas supply passage 26a and the fuel gas flow field 88. The second inlet buffer 96a includes a plurality of boss arrays each comprising a plurality of bosses 94a arranged in the direction indicated by the arrow C. Further, a second outlet buffer 96b is provided in the surface 86a of the second separator body 86, between the fuel gas discharge passage 26b and the fuel gas flow field 88. The second outlet buffer 96b includes a plurality of boss arrays each comprising a plurality of bosses 94b.

A second seal part 98 for preventing leakage of fluid (the reactant gases and the coolant) is provided on the surface 86a of the second separator body 86. As viewed in the separator thickness direction (indicated by an arrow A), the second seal part 98 extends straight. Alternatively, as viewed in the separator thickness direction, the second seal part 98 may extend in a wavy pattern.

The second seal part 98 includes a plurality of second passage seals 100 and a second outer peripheral seal part 102. The plurality of second passage seals 100 surround the oxygen-containing gas supply passage 22a, the oxygen-containing gas discharge passage 22b, the fuel gas supply passage 26a, the fuel gas discharge passage 26b, the coolant supply passage 24a, and the coolant discharge passage 24b, respectively.

Hereinafter, among the plurality of second passage seals 100, the second passage seal 100 which surrounds the fuel gas supply passage 26a will be referred to as a "second passage seal 100a", the second passage seal 100 which surrounds the fuel gas discharge passage 26b will be referred to as a "second passage seal 100b", the second passage seal 100 which surrounds the oxygen-containing gas supply passage 22a will be referred to as a "second passage seal 100c", and the second passage seal 100 which surrounds the oxygen-containing gas discharge passage 22b will be referred to as a "second passage seal 100d".

The second outer peripheral seal part 102 is provided in an annular shape in the outer peripheral portion of the second separator body 86. The second outer peripheral seal part 102 prevents leakage of the fuel gas. The second outer peripheral seal part 102 surrounds the fuel gas flow field 88, the second inlet buffer 96a, the second outlet buffer 96b, and the plurality of second passage seals 100a to 100d.

As shown in FIG. 2, the second seal part 98 includes a second metal bead 104 formed integrally with the second separator body 86 in a manner to protrude toward the resin frame equipped MEA 14, and a second resin member 106 provided on the second metal bead 104. The lateral cross sectional shape of the second metal bead 104 has a trapezoidal shape tapered toward the protruding direction of the second metal bead 104.

The second metal bead 104 includes a pair of second bead side portions 108 disposed in a manner to face each other, and a second bead top portion 110 coupling protruding ends of the pair of second bead side portions 108. The space between the pair of second bead side portions 108 is narrowed gradually toward the second bead top portion 110. It should be noted that the second bead side portion 108 may be in parallel to the separator thickness direction (indicated by the arrow A). That is, the second metal bead 104 may have a rectangular shape in lateral cross section.

The second resin member 106 is an elastic member fixed to the protruding end surface of the second metal bead 104 (outer surface of the second bead top portion 110) by printing or coating. For example, the second resin member 106 is made of polyester fiber, EPDM (ethylene propylene diene monomer) rubber, fluorine or silicone. The second resin member 106 is not porous member. Further, in the case where the second resin member 106 comprises closed foams, the second resin member 106 may be porous. Further, the second resin member 106 may be dispensed with.

In FIG. 4, the second separator body 86 is provided with a second inlet bridge 112a connecting the inside (closer to the fuel gas supply passage 26a) and the outside (closer to the fuel gas flow field 88) of the second passage seal 100a. The second separator body 86 is provided with a second outlet bridge 112b connecting the inside (closer to the fuel gas discharge passage 26b) and the outside (closer to the fuel gas flow field 88) of the second passage seal 100b.

As shown in FIG. 2, the second separator body 86 is provided with a second support part 114 for supporting the overlap part 52. The second support part 114 is formed integrally with the second separator body 86 in a manner that the second support part 114 protrudes toward the resin frame equipped MEA 14. A protruding end surface 114a of the second support part 114 contacts the outer peripheral portion 44o of the second gas diffusion layer 44. The second support part 114 is positioned between the second outer peripheral seal part 102 and the fuel gas flow field 88.

A step 116 is provided between the second support part 114 and the fuel gas flow field 88. The step 116 is inclined from the fuel gas flow field 88 toward the second support part 114, opposite to the second electrode 36. The step 116 extends in parallel to the inclined portion 56. It should be that the step 116 and the inclined portion 56 may not be in parallel to each other. The step 116 may extend in the direction indicated by the arrow A.

In FIGS. 1 and 2, a coolant flow field 118 is provided between a back surface 60b of the first separator body 60 and a back surface 86b of the second separator body 86. The coolant flow field 118 is connected to the coolant supply passage 24a and the coolant discharge passage 24b. The coolant flow field 118 is formed by the surface on the back of the oxygen-containing gas flow field 62 and the surface on the back of the fuel gas flow field 88

A compression load is applied to the fuel cell stack 12 (power generation cells 10) having the above structure in the separator thickness direction (indicated by the arrow A). Each of the first flow field forming protrusions 64, the first support part 84, and the first metal bead 74 is formed integrally with the first separator body 60 in a manner that the first flow field forming protrusions 64, the first support part 84, and the first metal bead 74 can be deformed elastically by application of the compression load. Each of the second flow field forming protrusions 90, the second support part 114, and the second metal bead 104 is formed integrally with the second separator body 86 in a manner that the second flow field forming protrusions 90, the second support part 114, and the second metal bead 104 can be deformed elastically by application of the compression load.

Figure 6:
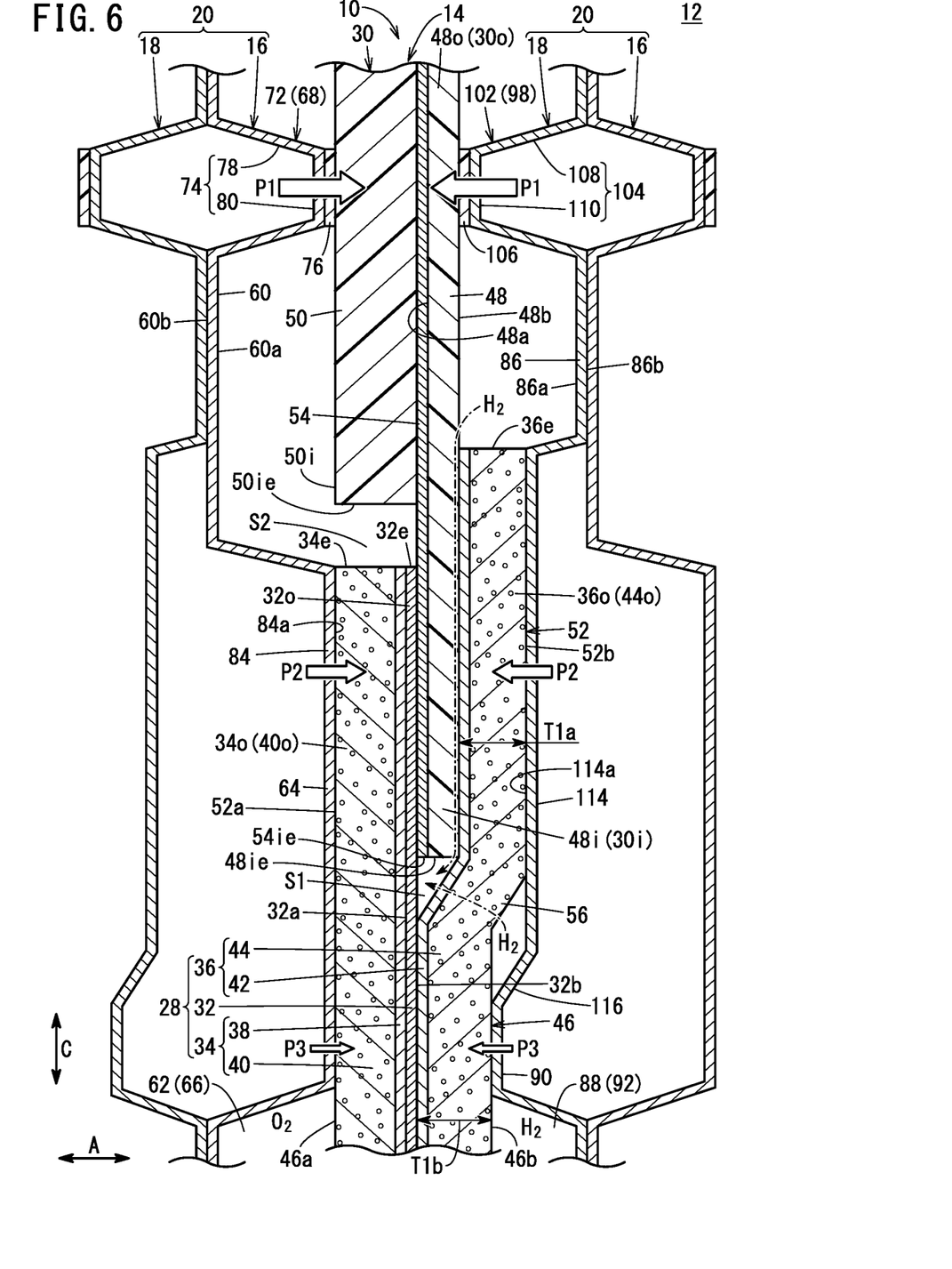
FIG. 6 is a partial enlarged vertical cross sectional view of FIG. 2.

As shown in FIG. 6, in the state where the compression load is applied to the power generation cell 10, the constituent components of the power generation cell 10 are formed in a manner to satisfy the relationship of P1>P2>P3, where P1 indicates a first surface pressure applied from the first seal part 68 and the second seal part 98 to the resin frame member 30, P2 indicates a second surface pressure applied from the first support part 84 and the second support part 114 to the overlap part 52, and P3 indicates a third surface pressure applied from the first flow field forming protrusions 64 and the second flow field forming protrusions 90 to the power generation area 46.

Figure 5:
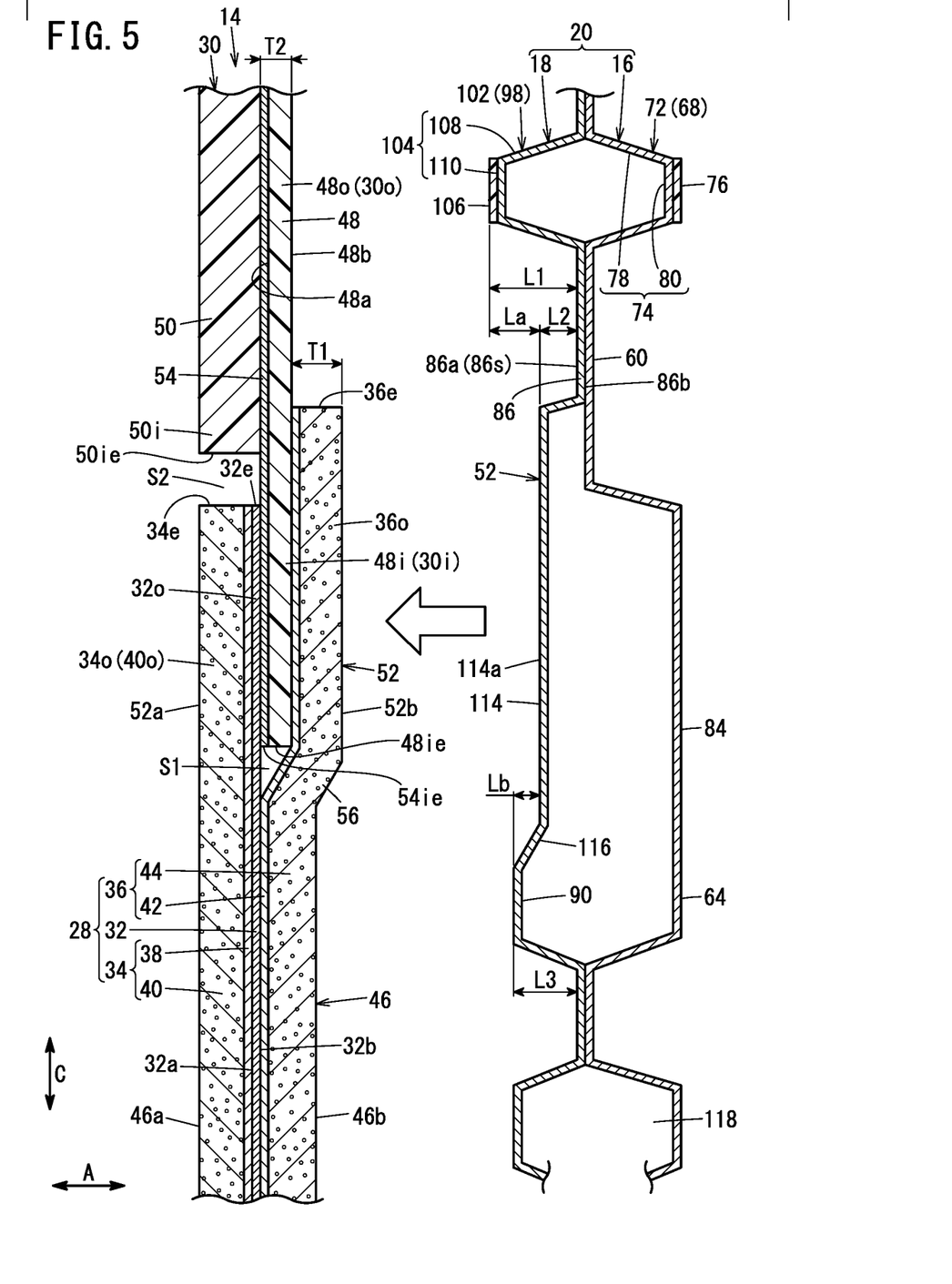
FIG. 5 is a partial vertical cross sectional view with partial omission showing a resin frame equipped MEA and a joint separator before application of a compression load.

Specifically, the second metal separator 18 has a shape as shown in FIG. 5, before the compression load is applied to the second metal separator 18. In FIG. 5, the first distance L1 is a straight distance in the direction indirection indicated by the arrow A, from the surface 86a (reference surface 86s) of the second separator body 86 to a surface (outer surface of the second resin member 106) which contacts the first frame shaped sheet 48 in the second seal part 98. The second distance L2 is a straight distance in the direction indicated by the arrow A from the reference surface 86s of the second separator body 86 to the surface which contacts the second gas diffusion layer 44 in the second support part 114 (protruding end surface of the second support part 114). The third distance L3 is a straight distance in the direction indicated by the arrow A from the reference surface 86s of the second separator body 86 to the surface in the second flow field forming protrusion 90 which contacts the second gas diffusion layer 44 (protruding end surface of the second flow field forming protrusion 90).

The difference La between the first distance L1 and the second distance L2 is larger than the thickness T1 of the second electrode 36 (the second electrode catalyst layer 42 and the second gas diffusion layer 44) (La>T1). Therefore, in the state where the compression load is applied to the power generation cells 10, i.e., in the state where the second resin member 106 contacts the other surface 48b of the first frame shaped sheet 48 and the protruding end surface 114a of the second support part 114 contacts the outer surface 52b of the overlap part 52, the first surface pressure P1 becomes larger than the second surface pressure P2.

The difference Lb between the third distance L3 and the second distance L2 (height of the step 116) is smaller than the thickness T2 of the portion including the adhesive layer 54 and the first frame shaped sheet 48 (Lb<T2). Therefore, in the state where the compression load is applied to the power generation cell 10, that is, in the state where the protruding end surface 114a of the second support part 114 contacts the outer surface 52b of the overlap part 52 and the second flow field forming protrusions 90 contact the outer surface 46b of the power generation area 46 adjacent to the second electrode 36, the second surface pressure P2 becomes larger than the third surface pressure P3. It should be noted that the thickness T2 is the distance from the surface of the adhesive layer 54 where the second frame shaped sheet 50 is present to the other surface 48b of the first frame shaped sheet 48.

The power generation cell 10 is not limited to the above structure. That is, in the state where the compression load is applied to the power generation cell 10, as long as the relationship P1>P2>P3 is satisfied, the structure of the power generation cell 10 may be changed as necessary. For example, the power generation cell 10 may be provided with a seal member for adjusting the surface pressure on the other surface of the first frame shaped sheet 48 so that the first surface pressure P1 becomes larger than the second surface pressure P2. Further, the power generation cell 10 may be provided with a sheet member for surface pressure adjustment on the outer surface of the second gas diffusion layer 44 in the overlap part 52 so that the second surface pressure P2 becomes larger than the third surface pressure P3.

In the power generation cell 10, as shown in FIG. 6, the fuel gas in the fuel gas flow field 88 passes through the second electrode 36 (the second gas diffusion layer 44 and the second electrode catalyst layer 42), and then, the fuel gas is guided into the internal space S1. Further, the fuel gas in the fuel gas flow field 88 flows from the outer peripheral side of the second electrode 36 into the internal space S1 through the position between the second electrode catalyst layer 42 and the first frame shaped sheet 48. Further, in the power generation cell 10, in the case where the second surface pressure P2 is relatively low, there is a concern that the fuel gas in the internal space S1 may be leaked to the outer peripheral side of the first electrode 34 through the position between the adhesive layer 54 and the electrolyte membrane 32. That is, cross leakage of the fuel gas from the fuel gas flow field 88 to the oxygen-containing gas flow field 62 may occur.

However, in the embodiment of the present invention, since the second surface pressure P2 is relatively large (P2>P3), it is possible to fix the adhesive layer 54 to the electrolyte membrane 32. Therefore, it is possible to effectively suppress cross leakage of the fuel gas in the internal space S1 leaked out to the oxygen-containing gas flow field 62 through the position between the adhesive layer 54 and the electrolyte membrane 32. Therefore, it is possible to suppress decrease in the power generation efficiency due to the cross leakage. Further, it is possible to suppress expansion/contraction of the resin frame member 30 and the electrolyte membrane 32 in the direction indicated by the arrow C by the frictional force of the second surface pressure P2 (it is possible to prevent breakage of the electrolyte membrane 32).

Further, as shown in FIG. 6, since the second surface pressure P2 is larger than the third surface pressure P3, the compression margin in the portion of the second electrode 36 forming the overlap part 52 (outer peripheral portion 36o of the second electrode 36) becomes larger than the compression margin in the portion of the second electrode 36 forming the power generation area 46. That is, the thickness T1a of the portion of the second electrode 36 forming the overlap part 52 (outer peripheral portion 36o of the second electrode 36) is smaller than the thickness T1b of the portion of the second electrode 36 forming the power generation area 46.

Next, operation of the fuel cell stack 12 having the above structure will be described.

Firstly, as shown in FIG. 1, an oxygen-containing gas is supplied to the oxygen-containing gas supply passage 22a. A fuel gas is supplied to the fuel gas supply passage 26a. A coolant is supplied to the coolant supply passage 24a.

The oxygen-containing gas is supplied from the oxygen-containing gas supply passage 22a into the oxygen-containing gas flow field 62 of the first metal separator 16. The oxygen-containing gas moves along the oxygen-containing gas flow field 62 in the direction indicated by the arrow B, and the oxygen-containing gas is supplied to the first electrode 34 of the MEA 28 (see FIGS. 1 and 3).

In the meanwhile, the fuel gas is supplied from the fuel gas supply passage 26a into the fuel gas flow field 88 of the second metal separator 18. The fuel gas moves along the fuel gas flow field 88 in the direction indicated by the arrow B, and the fuel gas is supplied to the second electrode 36 of the MEA 28 (see FIGS. 1 and 4).

Therefore, in the power generation area 46 of each of the MEAs 28 (see FIG. 2), the oxygen-containing gas supplied to the first electrode 34 and the fuel gas supplied to the second electrode 36 are partially consumed in electrochemical reactions to perform power generation.

Then, the oxygen-containing gas supplied to, and partially consumed at the first electrode 34 is discharged along the oxygen-containing gas discharge passage 22b in the direction indicated by the arrow A. Likewise, the fuel gas supplied to, and partially consumed at the second electrode 36 is discharged along the fuel gas discharge passage 26b in the direction indicated by the arrow A.

Further, the coolant supplied to the coolant supply passage 24a flows into the coolant flow field 118 formed between the first metal separator 16 and the second metal separator 18, and then, flows in the direction indicated by the arrow B. After the coolant cools the MEA 28, the coolant is discharged from the coolant discharge passage 24b.

The embodiment of the present invention offers the following advantages.

In the power generation cell 10, the relationship of P1>P2>P3 is satisfied, where P1 indicates the first surface pressure applied from the first seal part 68 and the second seal part 98 to the resin frame member 30, P2 indicates the second surface pressure applied from the first support part 84 and the second support part 114 to the overlap part 52, and P3 indicates the third surface pressure applied from the first flow field forming protrusions 64 and the second flow field forming protrusions 90 to the power generation area 46.

In the structure, since the second surface pressure P2 is larger than the third surface pressure P3, it is possible to reliably fix the resin frame member 30 to the MEA 28 by the first support part 84 and the second support part 114. Further, since the first surface pressure P1 is larger than the second surface pressure P2, it is possible to suppress leakage of fluid (reactant gases and the coolant) from the first seal part 68 and the second seal part 98 effectively.

The inner peripheral portion 30i of the resin frame member 30 is held between the outer peripheral portion 36o of the second electrode 36 and the outer peripheral portion 32o of the electrolyte membrane 32.

In the structure, it is possible to fix the inner peripheral portion 30i of the resin frame member 30 by the outer peripheral portion 36o of the second electrode 36 and the outer peripheral portion 32o of the electrolyte membrane 32.

In the overlap part 52, the adhesive layer 54 formed by an adhesive is provided between the inner peripheral portion 30i of the resin frame member 30 and the outer peripheral portion 32o of the electrolyte membrane 32. The inner space S1 is formed between the inner peripheral portion 30i of the resin frame member 30 and the power generation area 46. The first electrode 34 is the cathode, and the second electrode 36 is the anode.

In the structure, in the overlap part 52, it is possible to firmly join the inner peripheral portion 30i of the resin frame member 30 and the outer peripheral portion 32o of the electrolyte membrane 32 together by the second surface pressure P2 through the adhesive layer 54. Further, it is possible to tightly adhere the adhesive layer 54 and the outer peripheral portion 32o of the electrolyte membrane 32 together in an air-tight manner. It should be noted that, in the case of coating an adhesive which forms the adhesive layer 54 on the outer peripheral portion 32o of the electrolyte membrane 32, it is possible to adhere the adhesive layer 54 and the inner peripheral portion 30i of the resin frame member 30 with each other in an air-tight manner. Thus, it is possible to suppress cross leakage of the fuel gas leaked from the internal space S1 into the oxygen-containing gas flow field 62 through the position between the adhesive layer 54 and the electrolyte membrane 32 (or between the adhesive layer 54 and the resin frame member 30). Accordingly, it is possible to suppress decrease in the power generation efficiency due to cross leakage.

The resin frame member 30 includes the first frame shaped sheet 48 and the second frame shaped sheet 50 joined to the outer peripheral portion 48o of the first frame shaped sheet 48, and only the inner peripheral portion 48i of the first frame shaped sheet 48 is held between the outer peripheral portion 36o of the second electrode 36 and the outer peripheral portion 32o of the electrolyte membrane 32.

In the structure, in comparison with the case where the inner peripheral portion 48i of the first frame shaped sheet 48 and the inner peripheral portion 50i of the second frame shaped sheet 50 are held between the outer peripheral portion 36o of the second electrode 36 and the outer peripheral portion 32o of the electrolyte membrane 32, it is possible to reduce thickness of the overlap part 52.

The second electrode 36 includes the inclined portion 56 inclined from the power generation area 46 toward the overlap part 52, opposite to the first electrode 34. The second separator body 86 is provided with the step 116 between the fuel gas flow field 88 and the second support part 114, for positioning the protruding end surface 114a of the second support part 114 toward the side opposite to the electrolyte membrane 32, beyond the protruding end surface of the second flow field forming protrusion 90.

In the structure, by adjusting the height of the step 116, it is possible to make the second surface pressure P2 larger than the third surface pressure P3.

The present invention is not limited to the above described embodiment. Various modifications can be made without departing from the gist of the present invention.

The above embodiment will be summarized as follows:

In the embodiment of the present invention, the power generation cell (10) is provided. The power generation cell (10) includes the frame equipped membrane electrode assembly (14) and the pair of metal separators (16, 18) provided on both sides of the resin frame equipped membrane electrode assembly, a compression load being applied to the power generation cell (10) in a separator thickness direction, the frame equipped membrane electrode assembly including the membrane electrode assembly (28) formed by holding the electrolyte membrane (32) between the first electrode (34) and the second electrode (36), and the resin frame member (30) fixed to the membrane electrode assembly on the outer peripheral side of the power generation area (46) of the membrane electrode assembly, wherein the resin frame equipped membrane electrode assembly includes the overlap part (52) where the internal peripheral portion (30i) of the resin frame member is held between the outer peripheral portion (34o) of the first electrode and the outer peripheral portion (36o) of the second electrode, each of the pair of metal separators includes the separator body (60, 86) in the form of a plate, the separator body is provided with the flow field forming protrusion (64, 90) configured to contact the power generation area and form the reactant gas flow field as the passage of a reactant gas, the support part (84, 114) configured to contact the overlap part to support the overlap part, and the seal part (68, 98) configured to contact the resin frame member and prevent leakage of the reactant gas or a coolant as fluid, the seal part includes the metal bead (74, 104), each of the flow field forming protrusion, the support part, and the metal bead is formed integrally with, and protrudes from the separator body in a manner that the flow field forming protrusion, the support part, and the metal bead are configured to be deformed elastically by application of the compression load, and the relationship of P1>P2>P3 is satisfied, where P1 indicates a first surface pressure applied from the seal part to the resin frame member, P2 indicates a second surface pressure applied from the support part to the overlap part, and P3 indicates a third surface pressure applied from the flow field forming protrusion to the power generation area.

Further, the above embodiment provides the fuel cell stack (12). The fuel cell stack includes the plurality of power generation cells, the compression load being applied to the fuel cell stack in the separator thickness direction, the power generation cells each including the frame equipped membrane electrode assembly, and the pair of metal separators provided on both sides of the resin frame equipped membrane electrode assembly, the frame equipped membrane electrode assembly including the membrane electrode assembly formed by holding an electrolyte membrane between the first electrode and the second electrode, and the resin frame member fixed to the membrane electrode assembly on the outer peripheral side of the power generation area of the membrane electrode assembly, wherein the frame equipped membrane electrode assembly includes an overlap part where an internal peripheral portion of the resin frame member is held between an outer peripheral portion of the first electrode and an outer peripheral portion of the second electrode, each of the pair of metal separators includes a separator body in the form of a plate, the separator body is provided with the flow field forming protrusion configured to contact the power generation area and form the reactant gas flow field as a passage of a reactant gas, the support part configured to contact the overlap part to support the overlap part, and the seal part configured to contact the resin frame member and prevent leakage of the reactant gas or the coolant as fluid, the seal part comprises the metal bead, each of the flow field forming protrusion, the support part, and the metal bead is formed integrally with, and protrudes from the separator body in a manner that the flow field forming protrusion, the support part, and the metal bead are configured to be deformed elastically by application of the compression load, the relationship of P1>P2>P3 is satisfied, where P1 indicates the first surface pressure applied from the seal part to the resin frame member, P2 indicates the second surface pressure applied from the support part to the overlap part, and P3 indicates the third surface pressure applied from the flow field forming protrusion to the power generation area.

In the power generation cell and the fuel cell stack, the inner peripheral portion of the resin frame member may be held between the outer peripheral portion of the second electrode and an outer peripheral portion (32o) of the electrolyte membrane.

In the power generation cell and the fuel cell stack, in the overlap part, the adhesive layer (54) formed by an adhesive may be provided between the inner peripheral portion of the resin frame member and the outer peripheral portion of the electrolyte membrane, an inner space (S1) may be formed between the inner peripheral portion of the resin frame member and the power generation area, the first electrode may be a cathode, and the second electrode may be an anode.

In the power generation cell and the fuel cell stack, the resin frame member may include the first frame shaped sheet (48), and the second frame shaped sheet (50) joined to the outer peripheral portion (48o) of the first frame shaped sheet, and only the inner peripheral portion (48i) of the first frame shaped sheet may be held between the outer peripheral portion of the second electrode and the outer peripheral portion of the electrolyte membrane.

In the power generation cell and the fuel cell stack, the first electrode may include a first gas diffusion layer (40) configured to diffuse the reactant gas to the power generation area, the second electrode may include a second gas diffusion layer (44) configured to diffuse the reactant gas to the power generation area, and the surface size of the second gas diffusion layer may be larger than the surface size of the first gas diffusion layer.

In the power generation cell and the fuel cell stack, the outer peripheral portion of the second gas diffusion layer (44o) may be formed to be overlapped with the inner peripheral portion (50i) of the second frame shaped sheet in the separator thickness direction.

In the power generation cell and the fuel cell stack, the second electrode may include the inclined part (56) inclined from the power generation area toward the overlap part, opposite to the first electrode, and the separator body forming the metal separator adjacent to the second electrode, among the pair of metal separators may be provided with the step (116) between the reactant gas flow field and the support part, the step configured to position the protruding end surface of the support part toward the side opposite to the electrolyte membrane, beyond the protruding end surface of the flow field forming protrusion.

What is claimed is:

1. A power generation cell comprising:
a resin frame equipped membrane electrode assembly; and
a pair of metal separators provided on both sides of the resin frame equipped membrane electrode assembly, a compression load being applied to the power generation cell in a separator thickness direction,
the resin frame equipped membrane electrode assembly comprising:
a membrane electrode assembly formed by holding an electrolyte membrane between a first electrode and a second electrode; and
a resin frame member fixed to the membrane electrode assembly on an outer peripheral side of a power generation area of the membrane electrode assembly,
wherein the resin frame equipped membrane electrode assembly includes an overlap part where an internal peripheral portion of the resin frame member is held between an outer peripheral portion of the first electrode and an outer peripheral portion of the second electrode;
each of the pair of metal separators includes a separator body in a form of a plate;
the separator body is provided with
a support part protruding from a reference surface of the separator body toward the overlap part and configured to contact the overlap part to support the overlap part;
a flow field forming protrusion protruding from the support part toward the power generation area and configured to contact the power generation area and form a reactant gas flow field as a passage of a reactant gas; and
a seal part configured to contact the resin frame member and prevent leakage of the reactant gas or a coolant as fluid;
the seal part comprises a metal bead;
each of the flow field forming protrusion, the support part, and the metal bead is formed integrally with, and protrudes from the separator body in a manner that the flow field forming protrusion, the support part, and the metal bead are configured to be deformed elastically by application of the compression load;
the second electrode includes an inclined part inclined from the power generation area toward the overlap part, opposite to the first electrode,
the separator body forming a metal separator adjacent to the second electrode, among the pair of metal separators, is provided with a step connecting the flow field forming protrusion to the support part directly and configured to position a protruding end surface of the support part toward a side opposite to the electrolyte membrane, beyond a protruding end surface of the flow field forming protrusion,
the step comprises an inclined surface inclined from the flow field forming protrusion toward the support part, opposite to the second electrode, and
a relationship of P1>P2>P3 is satisfied,
where P1 indicates a first surface pressure applied from the seal part to the resin frame member, P2 indicates a second surface pressure applied from the support part to the overlap part, and P3 indicates a third surface pressure applied from the flow field forming protrusion to the power generation area.

2. The power generation cell according to claim 1, wherein an inner peripheral portion of the resin frame member is held between the outer peripheral portion of the second electrode and an outer peripheral portion of the electrolyte membrane.

3. The power generation cell according to claim 2, wherein in the overlap part, an adhesive layer formed by an adhesive is provided between the inner peripheral portion of the resin frame member and the outer peripheral portion of the electrolyte membrane;
an inner space is formed between the inner peripheral portion of the resin frame member and the power generation area;
the first electrode is a cathode; and
the second electrode is an anode.

4. The power generation cell according to claim 2, wherein the resin frame member comprises:
a first frame shaped sheet; and
a second frame shaped sheet joined to an outer peripheral portion of the first frame shaped sheet, and
wherein only an inner peripheral portion of the first frame shaped sheet is held between the outer peripheral portion of the second electrode and the outer peripheral portion of the electrolyte membrane.

5. The power generation cell according to claim 4, wherein the first electrode includes a first gas diffusion layer configured to diffuse the reactant gas to the power generation area;
the second electrode includes a second gas diffusion layer configured to diffuse the reactant gas to the power generation area; and
a surface size of the second gas diffusion layer is larger than a surface size of the first gas diffusion layer.

6. The power generation cell according to claim 5, wherein an outer peripheral portion of the second gas diffusion layer is formed to be overlapped with an inner peripheral portion of the second frame shaped sheet in the separator thickness direction.

7. A fuel cell stack comprising a plurality of power generation cells, a compression load being applied to the fuel cell stack in a separator thickness direction,
the power generation cells each comprising:
a resin frame equipped membrane electrode assembly; and
a pair of metal separators provided on both sides of the resin frame equipped membrane electrode assembly, the resin frame equipped membrane electrode assembly comprising:
a membrane electrode assembly formed by holding an electrolyte membrane between a first electrode and a second electrode; and
a resin frame member fixed to the membrane electrode assembly on an outer peripheral side of a power generation area of the membrane electrode assembly,
wherein the resin frame equipped membrane electrode assembly includes an overlap part where an internal peripheral portion of the resin frame member is held between an outer peripheral portion of the first electrode and an outer peripheral portion of the second electrode;
each of the pair of metal separators includes a separator body in a form of a plate;
the separator body is provided with
a support part protruding from a reference surface of the separator body toward the overlap part and configured to contact the overlap part to support the overlap part;
a flow field forming protrusion protruding from the support part toward the power generation area and configured to contact the power generation area and form a reactant gas flow field as a passage of a reactant gas; and
a seal part configured to contact the resin frame member and prevent leakage of the reactant gas or a coolant as fluid;
the seal part comprises a metal bead;
each of the flow field forming protrusion, the support part, and the metal bead is formed integrally with, and protrudes from the separator body in a manner that the flow field forming protrusion, the support part, and the metal bead are configured to be deformed elastically by application of the compression load;
the second electrode includes an inclined part inclined from the power generation area toward the overlap part, opposite to the first electrode,
the separator body forming a metal separator adjacent to the second electrode, among the pair of metal separators, is provided with a step connecting the flow field forming protrusion to the support part directly and configured to position a protruding end surface of the support part toward a side opposite to the electrolyte membrane, beyond a protruding end surface of the flow field forming protrusion,
the step comprises an inclined surface inclined from the flow field forming protrusion toward the support part, opposite to the second electrode, and
a relationship of P1>P2>P3 is satisfied,
where P1 indicates a first surface pressure applied from the seal part to the resin frame member, P2 indicates a second surface pressure applied from the support part to the overlap part, and P3 indicates a third surface pressure applied from the flow field forming protrusion to the power generation area.

8. The fuel cell stack according to claim 7, wherein an inner peripheral portion of the resin frame member is held between the outer peripheral portion of the second electrode and an outer peripheral portion of the electrolyte membrane.

9. The fuel cell stack according to claim 8, wherein in the overlap part, an adhesive layer formed by an adhesive is provided between the inner peripheral portion of the resin frame member and the outer peripheral portion of the electrolyte membrane;

an inner space is formed between the inner peripheral portion of the resin frame member and the power generation area;
the first electrode is a cathode; and
the second electrode is an anode.

10. The fuel cell stack according to claim 8, wherein the resin frame member comprises:
a first frame shaped sheet; and
a second frame shaped sheet joined to an outer peripheral portion of the first frame shaped sheet,
and wherein only an inner peripheral portion of the first frame shaped sheet is held between the outer peripheral portion of the second electrode and the outer peripheral portion of the electrolyte membrane.

11. The fuel cell stack according to claim 10, wherein the first electrode includes a first gas diffusion layer configured to diffuse the reactant gas to the power generation area;
the second electrode includes a second gas diffusion layer configured to diffuse the reactant gas to the power generation area; and
a surface size of the second gas diffusion layer is larger than a surface size of the first gas diffusion layer.

12. The fuel cell stack according to claim 11, wherein an outer peripheral portion of the second gas diffusion layer is formed to be overlapped with an inner peripheral portion of the second frame shaped sheet in the separator thickness direction.

13. A power generation cell comprising:
a resin frame equipped membrane electrode assembly; and
a pair of metal separators provided on both sides of the resin frame equipped membrane electrode assembly,
a compression load being applied to the power generation cell in a separator thickness direction,
the resin frame equipped membrane electrode assembly comprising:
a membrane electrode assembly formed by holding an electrolyte membrane between a first electrode and a second electrode; and
a resin frame member fixed to the membrane electrode assembly on an outer peripheral side of a power generation area of the membrane electrode assembly,
wherein the resin frame equipped membrane electrode assembly includes an overlap part where an internal peripheral portion of the resin frame member is held between an outer peripheral portion of the first electrode and an outer peripheral portion of the second electrode;
each of the pair of metal separators includes a separator body in a form of a plate;
the separator body is provided with
a support part protruding from a reference surface of the separator body toward the overlap part and configured to contact the overlap part to support the overlap part;
a flow field forming protrusion protruding from the support part toward the power generation area and configured to contact the power generation area and form a reactant gas flow field as a passage of a reactant gas; and
a seal part configured to contact the resin frame member and prevent leakage of the reactant gas or a coolant as fluid;
the seal part comprises a metal bead;
each of the flow field forming protrusion, the support part, and the metal bead is formed integrally with, and protrudes from the separator body in a manner that the flow field forming protrusion, the support part, and the metal bead are configured to be deformed elastically by application of the compression load;

a surface size of the second electrode is larger than a surface size of the first electrode, the second electrode includes an inclined part inclined from the power generation area toward the overlap part, opposite to the first electrode, the separator body forming a metal separator adjacent to the second electrode, among the pair of metal separators, is provided with a step between the reactant gas flow field and the support part, the step configured to position a protruding end surface of the support part toward a side opposite to the electrolyte membrane, beyond a protruding end surface of the flow field forming protrusion, the protruding end surface of the support part abuts against the second electrode throughout the outer peripheral portion of the second electrode extending in a surface direction of the electrolyte membrane, and a relationship of P1>P2>P3 is satisfied, where P1 indicates a first surface pressure applied from the seal part to the resin frame member, P2 indicates a second surface pressure applied from the support part to the overlap part, and P3 indicates a third surface pressure applied from the flow field forming protrusion to the power generation area.

14. A fuel cell stack comprising a plurality of power generation cells according to claim 13.

* * * * *